United States Patent
Salnikov et al.

(10) Patent No.: US 9,650,751 B2
(45) Date of Patent: May 16, 2017

(54) METHOD AND DEVICE FOR DEEPENING RIVERBEDS AND THEIR CLEANING FROM SEDIMENTS

(71) Applicants: Vladimir Grigorievich Salnikov, Almaty (KZ); Oleg Khanyshevich Khalidullin, Almaty (KZ); Kasym Koyanbaevich Duskaev, Almaty (KZ)

(72) Inventors: Vladimir Grigorievich Salnikov, Almaty (KZ); Oleg Khanyshevich Khalidullin, Almaty (KZ); Kasym Koyanbaevich Duskaev, Almaty (KZ)

(73) Assignee: AL-FARABI KAZAKH NATIONAL UNIVERSITY, Almaty (KZ)

( * ) Notice: Subject to any disclaimer, the term of this patent is extended or adjusted under 35 U.S.C. 154(b) by 0 days.

(21) Appl. No.: 14/629,745

(22) Filed: Feb. 24, 2015

(65) Prior Publication Data
US 2016/0244926 A1    Aug. 25, 2016

(51) Int. Cl.
*E02F 5/28* (2006.01)
*E02B 3/02* (2006.01)
*E02F 3/92* (2006.01)
*E02F 5/00* (2006.01)

(52) U.S. Cl.
CPC ............ *E02B 3/023* (2013.01); *E02F 3/9225* (2013.01); *E02F 5/006* (2013.01); *E02F 5/282* (2013.01)

(58) Field of Classification Search
CPC ... E02B 3/00; E02B 3/02; E02B 3/023; E02B 3/026; E02B 15/00; E02B 15/0814; E02B 8/02; E02F 5/28; E02F 5/282; E02F 5/285; E02F 5/006
See application file for complete search history.

(56) References Cited

U.S. PATENT DOCUMENTS

| | | | | |
|---|---|---|---|---|
| 4,116,833 A | * | 9/1978 | Stagemeyer | .......... E02B 15/048 210/242.3 |
| 6,038,795 A | * | 3/2000 | Navarro | .................. E02F 3/54 172/26.5 |
| 2005/0016930 A1 | * | 1/2005 | Nesfield | ................. E02B 3/023 210/747.5 |

FOREIGN PATENT DOCUMENTS

| | | | |
|---|---|---|---|
| RU | 2291930 | * | 1/2007 |
| RU | 2301297 | * | 6/2007 |
| WO | WO 2011/157211 | * | 12/2011 |

* cited by examiner

*Primary Examiner* — Benjamin Fiorello
*Assistant Examiner* — Carib Oquendo
(74) *Attorney, Agent, or Firm* — Nadya Reingand; Yan Hankin

(57) ABSTRACT

This invention relates to hydraulic engineering construction and can be used for deposit cleanup of river beds and channels. The object of the invention is to expand the arsenal of usable means for deposit cleanup and deepening of river beds, develop a method and create a device that uses the speed of the river current in the most effective way. The technical result of the claimed method is simplification and optimization of one existing method for cleanup of river beds and channels, increasing its functionality. The proposed method implements a movable water flow-restricting device with flow-guiding elements that creates a concentrated stream and directs it to a washout zone, bound by side walls, roof and washout surface.

16 Claims, 3 Drawing Sheets

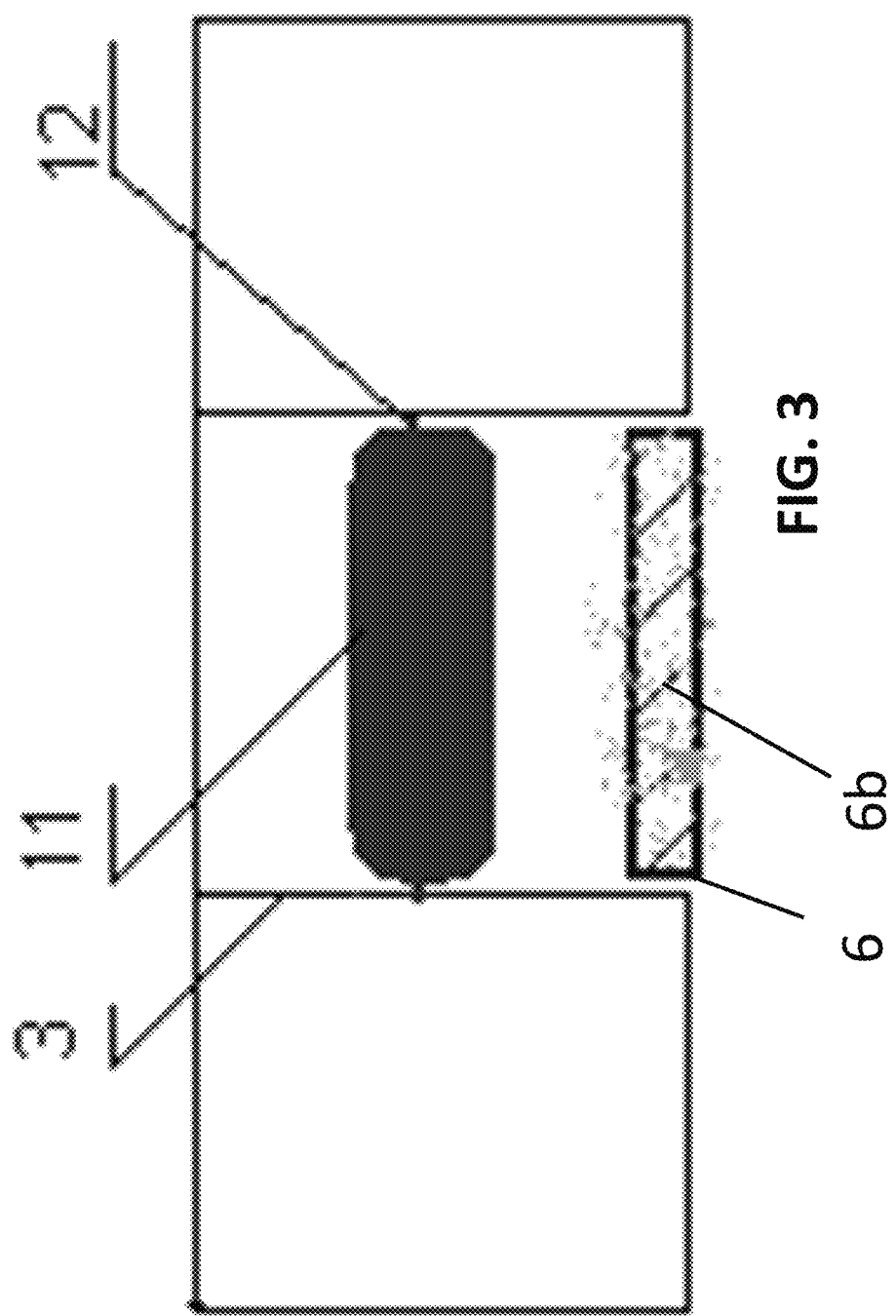

METHOD AND DEVICE FOR DEEPENING RIVERBEDS AND THEIR CLEANING FROM SEDIMENTS

CROSS-REFERENCE TO RELATED APPLICATIONS

This patent claims priority to Kazakhstan Patent application Serial No. No 2014/0223.1 filed Feb. 27, 2014 and received positive decision on Oct. 10, 2014.

FIELD OF THE INVENTION

The invention relates to hydroengineering construction and may be used for cleanup of river beds and channels from deposits.

BACKGROUND OF THE INVENTION

A known method for channel cleanup using a cleaning device includes the following. The deposit cleanup device for channels comprises a frame with drive mechanism and retaining shield shaped as channel cross-section, equipped with propeller-blade turbines with brush edging, longitudinally installed under the shield and mounted to the lower part thereof. Disadvantages of the stated technical solution are: the technical solution is inapplicable for deposit cleanup of riverbeds; the technical solution is overly complex and may therefore be unreliable; during device operation stone cannot be simultaneously collected to be used later; effectiveness may decrease or even equal zero if the channel contains large inclusions.

A known method for channel cleanup using excavators EM-152, EM-202 that load onto trucks includes the following. Disadvantages of this technical solution are: technical solution is rather expensive; energy is not harnessed from the flow of water, which would provide significant savings; during production process stone cannot be simultaneously collected to be used later.

There exist known methods for cleanup of rivers, lakes, and channels using dredgers, dredger excavators in combination with barges, which transport pulp to disposal and burial dump sites. Typically, river cleaning begins at the mouth and moves upstream. Disadvantages of such methods are that although the device cleans the river bed from deposits the water in the river remains contaminated.

There is a known method for cleanup of deposit from river beds, channels, and similar structures includes the following. According to the proposed method, cleanup is accomplished by the multitude of movements on the river bed or channel along and against the current of transport mechanisms with rotating propeller-blade devices stirring up sediment deposited on the bottom and transported by water flow over a distance of $L_i = (v/u_i) \cdot h_i$, where v—speed of the water flow; $u_i$—hydraulic particle size in the estimated fraction of desired cleaning level; $h_i$—stirring, height of the estimated fraction to be cleaned, depending on particle diameter: for particles with size d=0.005 mm—h=(0.7÷0.8)H, for d=2 mm—h=(0.3÷0.5)H, for d>10 mm—h=(0.1÷0.3)H; where H—depth of water flow. The number of movements of the rotating propeller-blade devices is determined by the Rill length of the cleanup area and the size of particulates deposited on the bottom of the sediment by the formula $n = L/L_i = (L \cdot u_i)/(v \cdot h_i)$, where L—the full length of the cleanup area of the river bed or channel. The invention uses maximum water flow energy for cleanup of deposit from river beds and channels, and has a lower operating cost, as well as increased efficiency and reliability. The disadvantage of this method is the need for continuous use of movable transport mechanisms.

There exists a known method for cleanup of deposit from river beds and channels, comprising the cut and grind of bottom deposit using a cutting tool and also water to impact the deposit and subsequently extract it. A water wheel powered by the flow of water rotates the cutting tool, performing the cut, grind, and circular movement of the deposit, resulting in the formation of centrifugal forces, which carry the deposit and water from the grinding zone, exhaust, which sucks water through water inlets to the zone of cut deposit grinding operations, and stirring thereof. Discharged pulp is washed away down the current by the flow of water. The rotary drive of the cutting tool is made in the form of a disc. Water inlets are made in the central part of the disc. Cutting elements are mounted on the disc according to the configuration of centrifugal wheel cutting blades. The technical result is increased energy efficiency of the removal of deposit from river beds and channels.

Disadvantages of this technical solution are: during the production process stone cannot be simultaneously collected to be used later; large inclusions (stones) can dull and damage the cutting element, leading to decreased effectiveness of the cutting mechanisms; bottom deposits are not removed from the river, but stirred in the water and moved downstream by the current and settle on the bottom.

There exists a known method for deepening and trueing a river bar which uses a movable water flow-restricting device that does not reach the floor of the river. The device consists of a float, sheet, cables, anchor-bags filled with soil and made from elastic film-fabric materials. The vessel is equipped with anchors. A winch raises and lowers the anchors. The anchor and attached sheet are lowered when moving, the vessel from shore to the bar. Next, a compressor pumped compressed air into the inner volume of the float, raise the dam and install it in the operating position so that there is a crevice between the lower edge of the sheet and the surface of the river bottom through which the river current washes urn a deep trench under the structure, thereby deepening the riverbed.

Disadvantages of this technical solution are: bottom deposits are not removed from the river, but transferred by the current and settle on the river bottom further downstream.

There exists a known method of hydraulic sluicing of river beds consisting of washing away deposits using water streams where smaller fractions are carried away by the current and larger fractions are used to secure the surface of the waterway to form an erosion pavement. Creating speeds in the bed for washing and carrying away deposits down the current during constant hydraulic sluicing is performed by the motion of sluicing the river bed reservoir. The bed reservoir is created by a device that functions as a water-retaining structure with geometrically variable sheet and height characteristics. The device for implementing the method comprises a horizontal sheet with ballast mounted onto it, connected to a crowding sheet using cable connections, forming a water inlet crevice along which canisters are mounted onto the sheet and controlled using a filler. The size of the crevice opening is controlled by a movable sheet that covers it. The movable sheet is secured to the cable connections using stabilizer rings and secured to the pressure sheet along the longitudinal guides and directly to the canister and to the horizontal sheet using cable connections via the guide rings mounted on them. Device movement along the sluicing path is accomplished by maneuvering the volume of the canister filler, made with an inner cable diaphragm, subtending it above the middle part and mounting it on the horizontal sheet at the location where it connects to the guylines carrying the control cable, which determines the position of the device in the bed waterway. This provides highly effective bed cleanup of bottom deposits and improves sanitary conditions of the waterway.

Disadvantages of this method are: when effectiveness of the sluicing mode is decreased due to buildup of deposit mass in front of the device, it is necessary to stop device operation and remove the inwash of bottom deposits.

There exists a known method for river bed cleanup, including installing on the river bed a hydraulic dam structure with adjustable water inlets, with water stored in dam ponds or reservoirs above the positions of the structure by opening water inlet in the structure. Opening the water inlets when the ponds or reservoirs are completely filled is done directly and in order, starting with the structure positioned at the bottom of the river and ending with the structure positioned at the top of the river. When the ponds or reservoirs are lightly filled the order is reversed, starting with the structure located at the top of the river and ending with the structure at the bottom of the river. River cleanup is accomplished by flushing the sludge and bottom deposits. This method has the following disadvantages, decreasing cleanup effectiveness: the sludge isn't removed from the river, but stirred and transferred from place to place and returns hack to the river, and large bottom deposits are not removed.

There exists a known method for cleanup of minor rivers having a following steps. The method includes partitioning the river into sections, extraction of bottom deposits and discharge of excess water. River cleanup begins at the source by partitioning parts of the river bed into lateral sections from shore to shore by temporary dams, which number six or more. The isolated section at the end of the river current in the partitioned section is used as a barrier for preventing water penetration from above and for preparatory work on river surface cleanup. Next, above the previous—used for processing and removing bottom deposits. Third—for flushing clod and gravel out of the sludge and pulp accretions. Fourth—for removing sand from the pulp. Fifth—for settling water out of the remaining sludge. Sixth—for forming a new bottom from the clod, gravel, and sand and filling it with technically clean water. Products of bottom deposit selection are washed from the sludge by subsequent neutralization in process activation apparatuses and removal of harmful compound components by the mixture. Large stones, gravel, and sand that have sludge washed away are placed back on the deposit-free river bottom. All products of processing bottom deposits, except for scrap metals and mixtures of heavy metal compounds, are reused for forming the new river bottom section, previously cleaned from deposits. For passage of excess river water a dismountable sectional trough is used, and to compensate for sudden volleys of water into the river an additional pump and water line are used, which are placed parallel to the trough. The invention allows for the removal of deposits from rivers and their processing is not accompanied by harmful components getting into the river. The volume of shipped products of bottom deposit processing is reduced and the use of containers is eliminated. The need to allocate sections of land for stockpiling products of river cleanup is completely eliminated.

Disadvantages of this technical solution are: the technical solution is complex and laborious, involves additional logistical and human resources for processing bottom deposits, requires use of harmful components.

There exists a known method that can be used for deposit cleanup of river beds, channels, and other structures consisting of the following. This method involves removal of deposits from river beds, performed by successive lateral bulldozer movements: initially bulldozers with flat blades make a rough grading of the river bed, then bulldozers with gravel blades, having varied spacing between the blades, begin cleanup of the river bed with the formation of flow-guiding dams, where first the bulldozers with larger-spaced gravel blades pass, then the bulldozers with smaller-spaced blades pass. The dam body is filled in cross-sections by successively moving bulldozers with gravel blades such that the upper dam slope contains larger fractions and at the top and lower slope—smaller fractions, after which the deposits, cleaned of large fractions, are moved by bulldozers with flat blades to the river axis for subsequent flushing from the river bottom by water streams during flooding. The invention improves deposit cleanup of river beds and channels and lowers the cost of cleanup. Disadvantages of this invention are: need for preliminary drying/shoaling of river bottom, which, aside from everything else, may harm the ecosystem; water flow energy isn't utilized.

The closest analog to the present invention is the method of bottom deposit cleanup and deepening of river beds which includes the following: the bottom deposits are flushed using water flows, created by a movable water flow-restricting device with flow-guiding elements, the flushing flow of water is created by installing a water flow-restricting device with flow-guiding elements on a flotation vehicle, preferably in its lower portion. This creates a wash-away zone under the bottom of the flotation vehicle. The flotation vehicle is moved along the river with a speed that provides a wash-out of bottom deposits. Before cleaning and deepening of the river, the terrain of the bottom deposits is determined. The unwashed part of the bottom deposits is crushed mechanically using additional devices located on the flotation vehicle. Washed out and mechanically crushed bottom deposits are collected in floating containers, which detach from the flotation vehicle after filling. The water flow-restricting device with flow-guiding elements contains longitudinal ribs preferably mounted on the bottom of the flotation device, where the flow-guiding elements are made in the form of plates, installed on hinges at the end portions of the longitudinal ribs with the ability to adjust the gap between them. Rib surfaces, the bottom of the flotation vehicle, and surfaces of flow-guiding elements form a cavity above the surface of the river bottom. Addition devices are mounted on the longitudinal ribs, directed at the wash-out zone, for mechanical crushing of unwashed portions of bottom deposits, for example, cutting devices in the form of plowshares, worm screws, and rotors. Cutting devices in the form of plowshares are implemented to provide the ability to change the direction of its edges. Cutting devices in the form of worm screws or rotors are equipped with drives. The worm screw or rotor drives are made in the form of blades, whose rotation is powered by the flow of water. Cutting devices on the longitudinal ribs are positioned to account for the thickness of the bottom deposits.

The disadvantage of this method is the complexity of implementation, several stages can be simplified.

SUMMARY

The object of the invention is to expand the arsenal of usable means for deposit cleanup and deepening of river beds, develop a method and create a device that uses the speed of the river current in the most effective way.

The technical result is to create a device for cleanup of river beds and channels that is more functional, convenient and easy to operate, which optimally uses the speed of river currents, and consequently, lowers the energy and labor costs of deposit cleanup of river beds and channels.

The device includes a movable water flow-restricting device coupled to a float. A washout zone is formed in an output lower part of the flow-restricting device and is constrained by side walls, a top plate gradually sloping down to a washout front. The washout front is disposed at an angle to a direction of a flow, and an output is located at an acute front corner of the washout in one embodiment, a damper plate is placed inside the flow-restricting device as an adjustable flow barrier.

BRIEF DESCRIPTION OF THE DRAWINGS

FIG. 3 shows the device from behind.

DETAILED DESCRIPTION OF THE INVENTION

Figure 1:
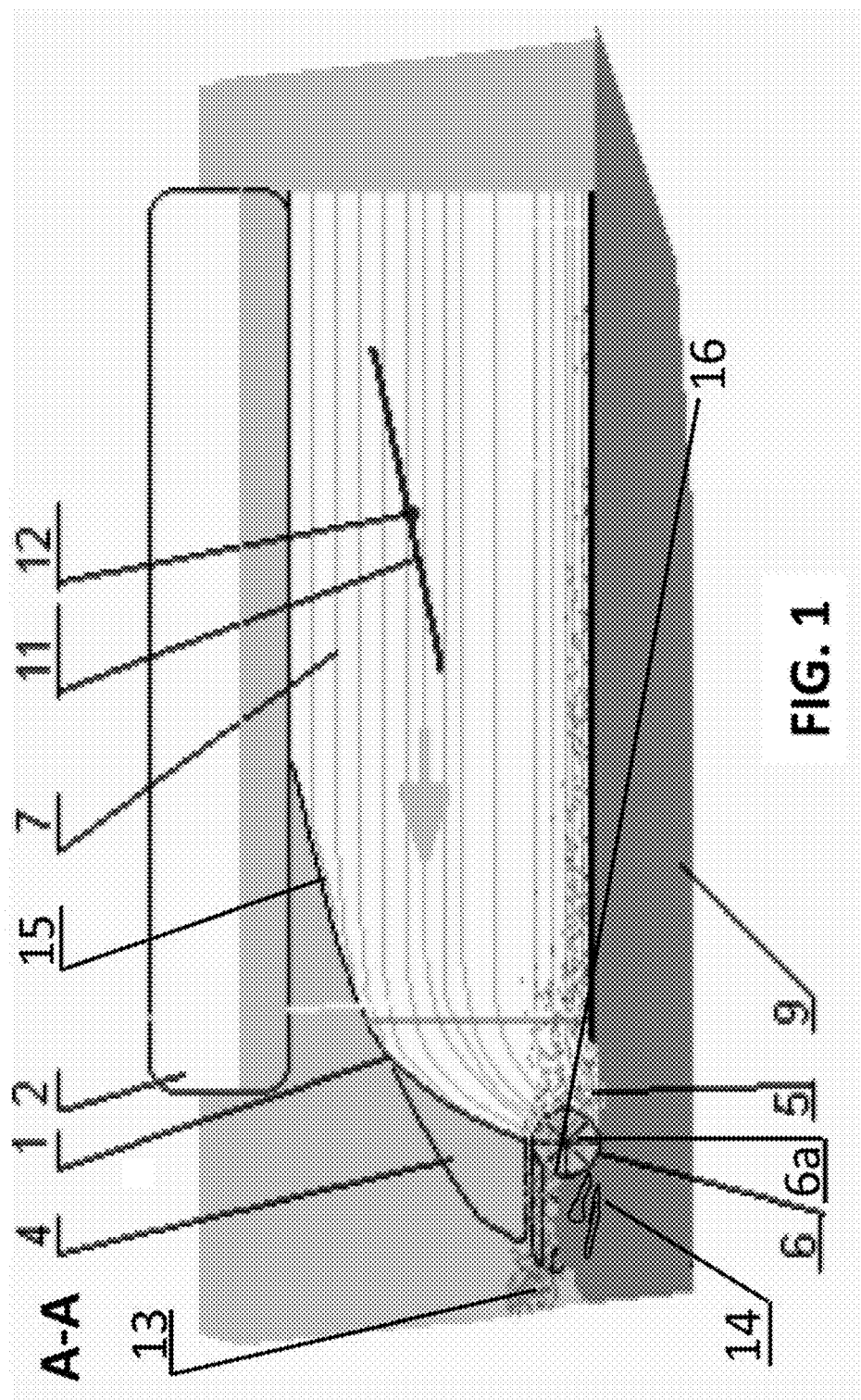
FIG. 1 shows the side view of the device of the present invention.
Figure 2:
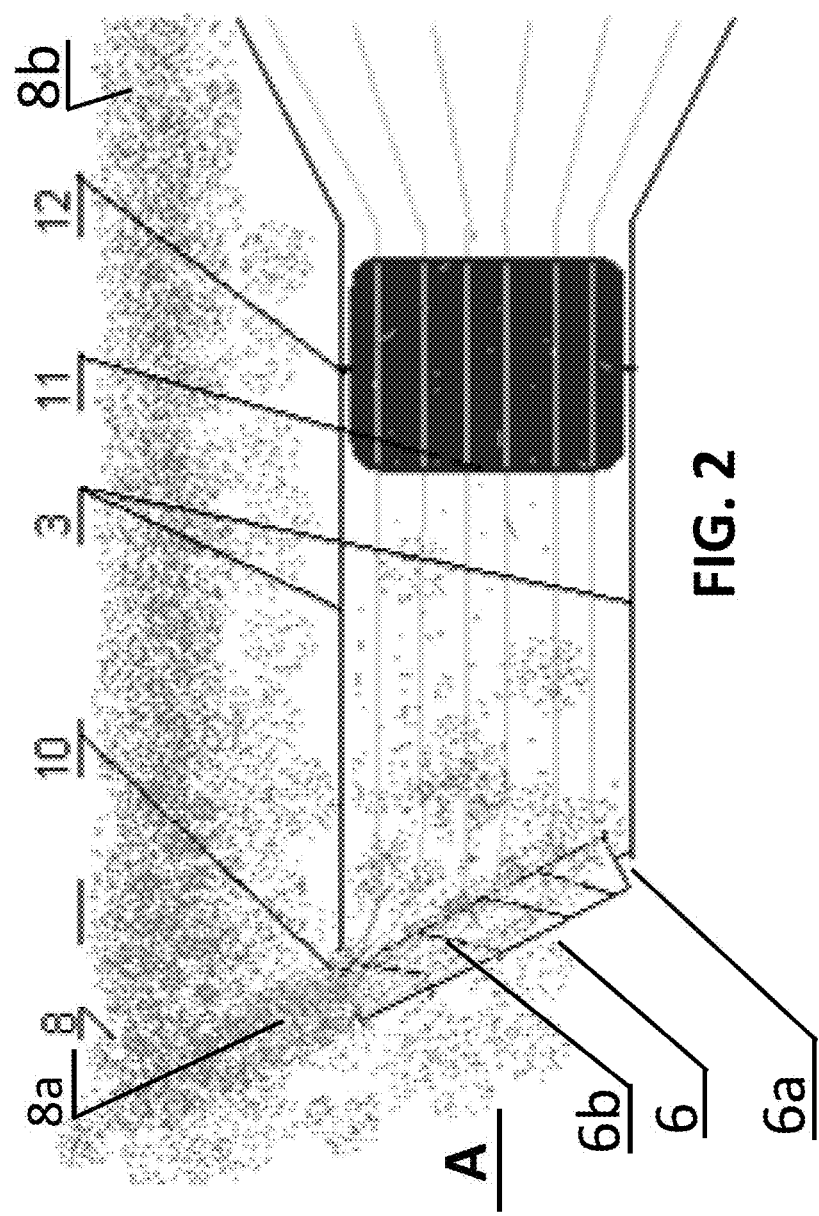
FIG. 2 shows the top view of the device of the present invention.

The technical result is achieved as follows: bottom deposits are washed out by a flow of water, created by the described-below device for deposit cleanup and deepening of riverbeds, shown on the longitudinal cross-section (side view) in FIG. 1, in the horizontal cross-section (top view) in FIG. 2, and FIG. 3 shows the device from behind. The proposed device comprises a water flow-restricting device 1, mounted on the flotation vehicle—float 2. Water flow-restricting device 1 is made sufficiently heavy and at the same time remains suspended in or under water, floating freely and being carried by the river current. The direction of the current is shown by the arrow in FIG. 1, and the water is depicted as horizontal lines. The float thus may be suspended at the specified depth, which is adjustable by varying the supply of air or water introduced into the cavity of the float 2 (see Fig, 1 for an exemplary showing of a particular ratio of water, as indicated by the grey coloring, to air, as indicated by the white coloring, within the cavity). Orientation and positioning of the water flow-restricting device 1 is performed by the vertical side wails 3. Upon reaching a sandbar, or the like, of the bottom terrain 9, the front wall 4 of the device 1 becomes pressed against the sandbar; the device 1 is stopped, an intensified flow of water 7 is self-initiated because the device 1 is trapped against the sandbar and no longer moving with the current. The upper portion of the water flow-restricting device 1 forms a roof 15 which gradually slopes downward into the washout zone 5, and thus the intensified flow of water 7 is directed towards the front wall 4. The flow of water 7 then turns further downward at the front wall 4 and digs into the washout zone 5. The device may also be equipped with a driving mechanism 16, which controls a milling element 6, (i.e. a driving mechanism may activate a spinning rotor 6 on an axis 6a with a serrated work surface 6b). The rotor 6 can be activated when necessary, for example, upon reaching hard sedimental deposits 14. Drive and kinematics not shown. Particles 8 of the bottom deposits (shown on FIGS. 1-3 as dots) are washed away via the wash out zone 5, and the particles 8 are further carried out by the flow of water to one side 8b of the river through an outlet 10; the particle mixture 8a, which comes Out of the outlet 10 at an angle relative to the side wall 3 of the device 1, is deposited along one side of the body of water as the device 1 moves through the water (see FIG. 2). To increase the activation impact, the water flow-restricting device 1 has a damper 11 which can rotate around an axis 12; the damper 11 has the ability to rotate in order to completely stop the water flow. Drive and kinematics not shown on the diagram. The damper 11, by changing its orientation, also allows for formation of pulsating flows with various speeds and various water outflow capacities, thereby activating the washout zone 5 with varying power. Pulsation is created by periodically closing and opening the damper 11.

In one embodiment, the method f or deepening river beds comprises deploying a movable water flow-restricting device with flow-guiding elements that creates a concentrated stream and directs it to a washout zone, bound by side walls, a roof, and a washout surface, and impacting hard bar portions with or without a spinning rotor using a driving mechanism, characterized by maximally confining the washout zone from the external environment by way of pressing the flow-restricting device to a bottom with an ability of the side walls to follow along the bottom terrain within a range of specified depths, the stream of water is directed to the washout zone, bound by the side walls, the roof which is gradually sloped into the washout zone, and the washout surface, with a washout front and an outlet of washout mixture being directed at an angle relative to a side wall of the device and to one side, wherein a main flow cross-section is gradually decreased from the entrance of the restricting device (i.e. where the water enters) to the outlet (i.e. where the water and particles exit). In some aspects, the driving mechanism loosens hard parts of the washout surface by controlling a spinning rotor with a serrated working surface. In some aspects, the washout mixture is directed along a trajectory of a motion of t he flow-restricting device. In some aspects, the washout mixture is suspended on the way to the nearest deep. In some aspects, the method further comprises maintaining a suspended condition by supplying compressed air to the washout zone and by a washout mixture flotation. In some aspects, the method further comprises maintaining a suspended condition by moving a near-bottom vibrating mechanism on a path of the mixture depositing, the mechanism comprising nets made of flexible elements with activators fixed to them. In some aspects, the device follows along the bottom terrain using buoyancy changes of individual parts of the side walls, In some aspects, the device follows along the bottom terrain by using changes in side wall height due to elasticity of the bottom edges of the side walls. In some aspects, the washout water stream is regulated using a bottom plate 17, the bottom plate 17 being positioned from an inlet of the water flow-constricting device to a start of the washout zone. In some aspects, the method further comprises cutting off a specified bar layer using a bottom plate edge 18. In some aspects, the method further comprises loosening of bed deposits with a vibrating edge 18 of the bottom plate 17. In some aspects, the flow rate of the washout water stream is changed by adjusting with various frequencies a cross section the output in the range from its maximum to nearly zero flow.

Also disclosed is an apparatus for deepening river beds, comprising a movable water flow-restricting device coupled to a float, wherein a washout zone is formed in an output lower part of the flow-restricting device and is constrained by side walls, a roof gradually sloping down to a washout front, the front being disposed at an angle relative to the side wall of the device, and an outlet is located at an acute front corner of the washout, and further comprising a damper plate placed inside the flow-restricting device as an adjustable flow barrier. In some aspects, the float is designed as a set of vertical hollow walls filled with controlled amounts of air 19 and water 20. In some aspects, the damper plate opens periodically creating pulsating flows of water facilitating the washout.

Although several exemplary embodiments have been herein shown and described, those of skill in the art will recognize that many modifications and variations are possible without departing from the spirit and scope of the invention, and it is intended to measure the invention only by the appended claims.

What is claimed is:

1. A method for deepening river beds, comprising:
deploying a movable water flow-restricting device with flow-guiding elements that creates a concentrated stream of water and directs the water to a washout zone,
the device being bound by side walls, a front wall, a roof, and a washout surface,
further loosening hard bar portions with a spinning rotor of the device, said rotor being located at the washout zone and at a front of the device,
maximally confining the washout zone from an external environment by pressing the flow-restricting device to a waterway's bottom terrain,
the stream of water being directed to the washout zone,
the stream of water being bound by the side walls, the stream of water being bound by the roof which is gradually sloped into the washout zone, and the stream of water being bound by the washout surface, wherein the front wall and the spinning rotor form a washout front, the washout front comprising an outlet through which a washout mixture is directed at an angle relative to a side wall of the device and directed towards one side of the device; and
wherein a main flow cross-section is gradually decreased from an opening of the water flow-restricting device to the washout front.

2. The method according to claim 1, further comprising loosening hard parts of the washout surface by a serrated working surface of the spinning rotor.

3. The method according to claim 1, wherein the washout mixture is placed curbside along a trajectory of a motion of the flow-restricting device.

4. The method according to claim 1, further comprising following along a bottom terrain using buoyancy changes of the side walls.

5. The method according to claim 1, further comprising following along a bottom terrain using changes in side wall height due to a variable elasticity of the side walls.

6. The method according to claim 1, further comprising regulating the washout mixture using a bottom plate, positioned between an inlet of the water flow-restricting device and the washout zone.

7. The method according to claim 6, further comprising cutting off a waterway bottom layer using a bottom plate edge.

8. The method according to claim 1, further comprising loosening of bed deposits with a vibrating bottom plate edge.

9. The method according to claim 1, wherein a flow rate of the washout mixture is changed by adjusting a frequency output.

10. The method of claim 1, further comprising employing a driving mechanism, said driving mechanism controlling said spinning rotor.

11. An apparatus for deepening river beds, comprising:
a movable water flow-restricting device with flow-guiding elements that creates a concentrated stream of water and directs the water to a washout zone,
the device being bound by side walls, a front wall, a roof top plate, and a washout surface,
the apparatus being equipped with a spinning rotor, said rotor being located at the washout zone and at a front of the apparatus,
the apparatus maximally confining the washout zone from an external environment by way of pressing the side walls of the apparatus to a waterway's bottom terrain with an ability of the side walls to copy the bottom terrain within a range of specified depths,
such that the stream of water is directed to the washout zone,
such that the stream of water is bound by the side walls,
such that the stream of water is bound by the roof, which is gradually sloped into the washout zone,
and such that the stream of water is bound by the washout surface,
wherein the front wall and the spinning rotor form a washout front, the washout front comprising an outlet through which a washout mixture is directed,
wherein the washout front is positioned at an angle relative to a side wall of the apparatus thus directing the washout mixture towards one side of a waterway, and
wherein a main flow cross-section of the apparatus gradually decreases from an opening of the apparatus to the washout front.

12. The apparatus of claim 11, further comprising a float, the float being coupled to the roof of the apparatus.

13. The apparatus of claim 12, wherein the float contains a controlled amount of air and water.

14. The apparatus of claim 11, further comprising a damper plate, wherein the damper plate turns about an axis to open and close periodically, creating a pulsating stream of water.

15. The apparatus of claim 11, further comprising a vibrating bottom plate for loosening hard bottom deposits.

16. The apparatus of claim 11, further comprising a driving mechanism, said driving mechanism controlling said spinning rotor.

* * * * *

UNITED STATES PATENT AND TRADEMARK OFFICE
CERTIFICATE OF CORRECTION

PATENT NO. : 9,650,751 B2  
APPLICATION NO. : 14/629745  
DATED : May 16, 2017  
INVENTOR(S) : Salnikov et al.

Page 1 of 1

It is certified that error appears in the above-identified patent and that said Letters Patent is hereby corrected as shown below:

On the Title Page

At Item (72), Inventors:  
Delete "Valdimir Grigorievich Salnikov and  
Kasym Koyanbaevich Duskaev"  
And insert --Vitaly Grigorievich Salnikov and  
Kassym Koyanbaevich Duskayev--

Signed and Sealed this  
Sixteenth Day of July, 2019

Andrei Iancu  
*Director of the United States Patent and Trademark Office*